April 15, 1952 C. W. ABERCROMBIE 2,592,992
PRESSURE COOKER RELIEF VALVE

Filed Jan. 21, 1946 3 Sheets-Sheet 1

INVENTOR
CHARLES W. ABERCROMBIE
BY
ATTORNEYS

April 15, 1952  C. W. ABERCROMBIE  2,592,992
PRESSURE COOKER RELIEF VALVE

Filed Jan. 21, 1946  3 Sheets-Sheet 2

INVENTOR
CHARLES W. ABERCROMBIE
BY
Pennie, Edmonds, Morton, & Barrows
ATTORNEYS

April 15, 1952     C. W. ABERCROMBIE     2,592,992
PRESSURE COOKER RELIEF VALVE

Filed Jan. 21, 1946     3 Sheets-Sheet 3

INVENTOR
CHARLES W. ABERCROMBIE
BY
*Pennie Edmonds Morton & Barrows*
ATTORNEYS

Patented Apr. 15, 1952

2,592,992

UNITED STATES PATENT OFFICE 2,592,992

PRESSURE COOKER RELIEF VALVE

Charles W. Abercrombie, Bridgeport, Conn., assignor, by mesne assignments, to Karen Products, Inc., New York, N. Y., a corporation of New York Application January 21, 1946, Serial No. 642,526

11 Claims. (Cl. 137—53)

This invention relates to pressure cookers and in particular to improved means for controlling the working pressure obtainable within the cooker. It relates also to an improved safety valve.

Pressure cookers, as the name indicates, are designed to operate at pressures above atmospheric. Some are designed to operate at a fixed maximum pressure, a relief valve opening at that point to vent steam and closing when sufficient steam has blown off to reduce the pressure to a point at which the valve can close again. Some are provided with control means so that the cook may choose the proper pressure for a given food, but none of these, so far as I am aware, have been wholly satisfactory. It is an object of the present invention to provide simple and efficient means for setting the pressure at any one of a plurality of different degrees, from atmospheric to say fifteen pounds per square inch above atmospheric. I attain this object broadly as follows: The pressure relief vent is closed by a steel ball valve of insignificant weight, which, if not held on its seat at the upper end of the vent passage, would be displaced at substantially any cooker pressure above atmospheric. I hold this ball on its seat by means of a weight supported upon the ball and at a second point spaced from the ball and beyond the center of gravity of the weight. This center of gravity being fixed, the effective pressure exerted by the weight upon the ball depends upon the distance of the second point of support from the ball and this distance can be varied as follows: I make the weight in the form of a rotatable knob journalled upon the cooker, and provide the underface of this knob with a plurality of projections spaced at progressively greater distances from the axis of the knob. I also provide a slightly elevated groove on the cooker beneath the knob constituting in effect a series of pockets within which any one of the projections may be seated by appropriate manipulation of the knob and made to serve as the second point of support or fulcrum. Thus the cook, by turning the knob, which is suitably marked shifts the fulcrum, and varies the moments of the weighted knob about that fulcrum thereby readily controlling the pressure at which the ball will be displaced and hence the pressure at which the food will be cooked.

At one point on the underface of the knob I provide a depression large enough to receive the ball and permit its outward movement under pressure. Thus, when the knob is set so that this depression overlies the ball, the steam within the cooker is vented at substantially atmospheric pressure.

In addition to the working relief valve which fixes the maximum cooking pressure, every pressure cooker must also be provided with a safety valve so that should the working valve become stuck in closed position the safety valve will surely blow at a set pressure and thus forestall an explosion that could be fraught with tragic consequences. It is a further object of the present invention to provide such a safety valve, placing it where it will be inconspicuous and protected yet ready at all times to perform its function should occasion require it. I attain this object by journalling the pressure-setting knob on a hollow boss or gudgeon communicating at its inner end with the interior of the cooker and at its outer end, with a cup in the top of the knob. The outer end of the cylindrical bore is sealed by means of a metal disk seated upon it and fixed there by means of a low melting point solder which gives way at a known and safe temperature and pressure to permit unseating of the disk. Means are provided for restricting movement of the unseated disk so that it cannot be shot into the room at projectile speed and perhaps cause damage.

In the accompanying drawings I have illustrated a preferred embodiment of my invention, although others could doubtless be devised within the scope of the appended claims. In these drawings:

Figure 1:
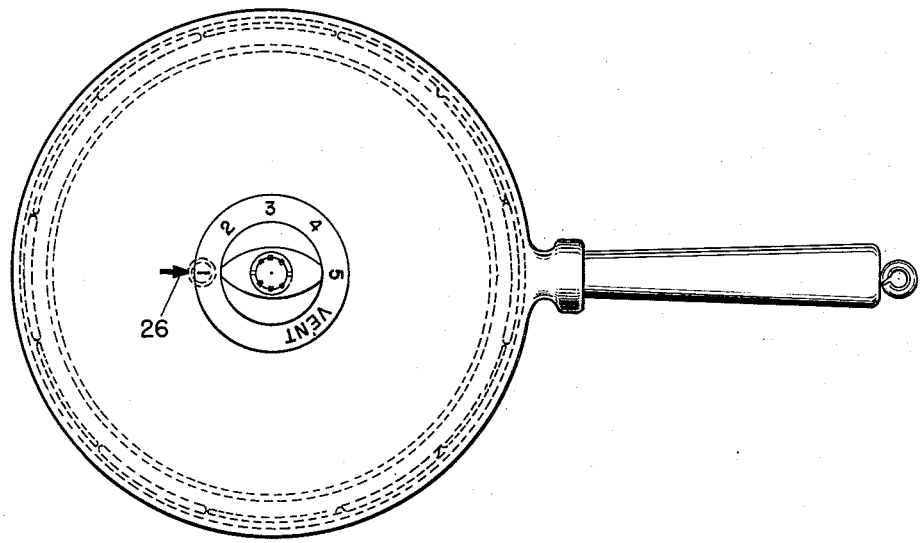
Figure 1 is a plan view of a pressure cooker equipped with the pressure-setting knob and safety valve of the present invention.
Figure 2:
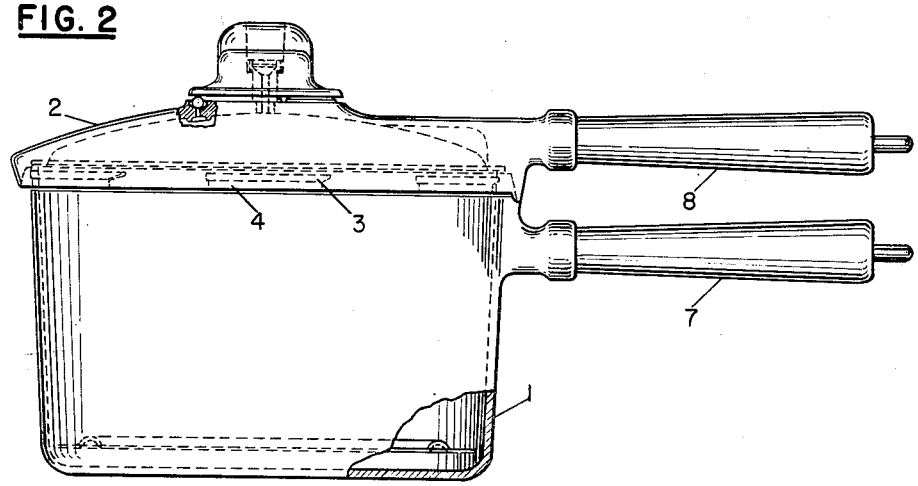
Figure 2 is a side elevation of the same cooker.
Figure 3:
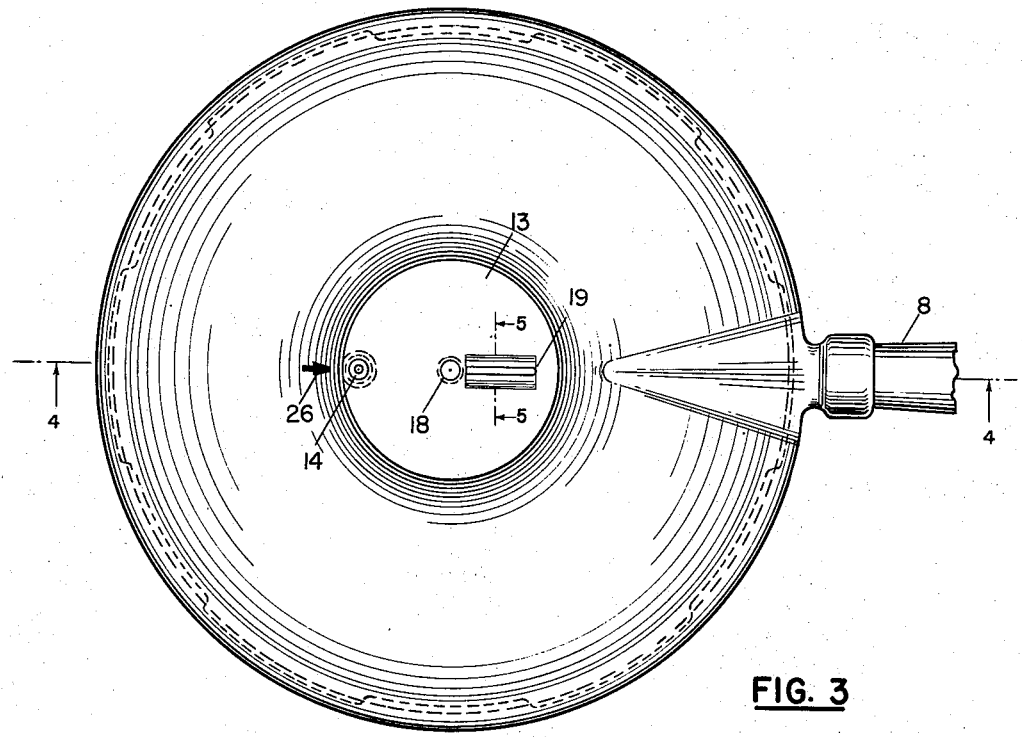
Figure 3 is a plan view of the cover, on a somewhat enlarged scale, with the pressure-setting knob removed.
Figure 4:
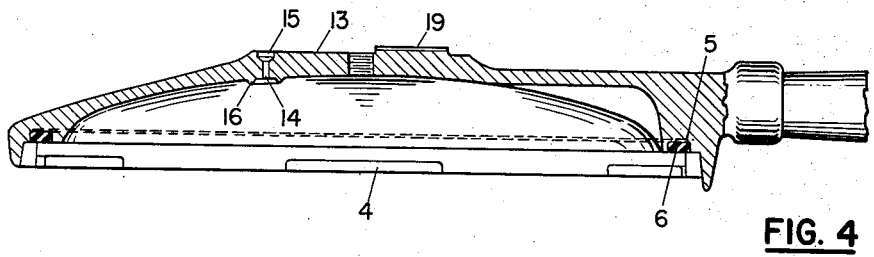
Figure 4 is a vertical section taken along line 4—4 of Figure 3.
Figure 5:
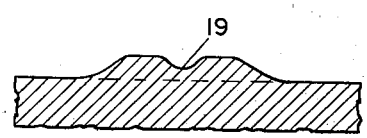
Figure 5 is an enlarged cross-section through the knob-supporting groove taken along line 5—5 of Figure 3.
Figure 7:
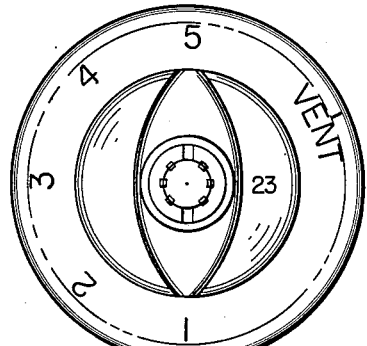
Figure 7 is a plan view, on an enlarged scale, of the pressure-setting knob.

The pressure cooker shown in these drawings comprises a body or container 1 on which is mounted a cover 2. The body is provided, just below its rim, with a series of spaced external cam lugs 3. The cover is likewise provided on its flange with a series of spaced internal cam lugs 4 designed to cooperate with the lugs on the body to hold the cover in place during the cooking operation. The inner edge of the cover just above the flange is provided with an annular groove 5 which serves as the seat for an annular gasket 6 against which the rim of the body presses to form a tight seal during the cooking operation. The body is provided with a handle 7 and the cover with a handle 8. To mount the cover upon the body the cover handle 8 is swung counterclockwise to make an angle of some 30° with the handle 7. The proper angular relationship between the handles is determined by a lug 9 depending from the flange of the cover and an upstanding lug 11 on the body at the inner end of the handle 7. The handle 8 should be swung counterclockwise until the lug 9 engages the lug 11. In this position the lugs 4 on the cover pass between the lugs 3 on the body, and the rim of the body lies against the gasket 6. The handle 8 is then swung clockwise causing the lugs 4 to move below and be cammed down by the lugs 3, drawing the gasket 6 firmly against the rim of the body and making a steam-tight seal between the cover and the body. When the two handles are in vertical alignment the cover is properly seated on the body and this position is reached when a lug 12 which depends from the flange of the cover engages the lug 11 on the body.

Figure 10:
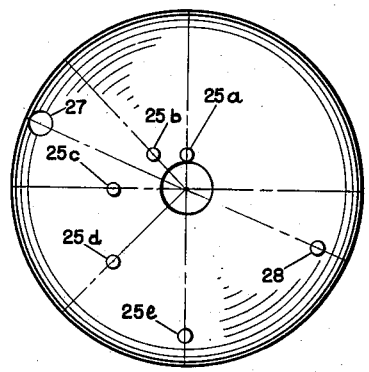
Figure 10 is a bottom view of the knob.
Figure 8:
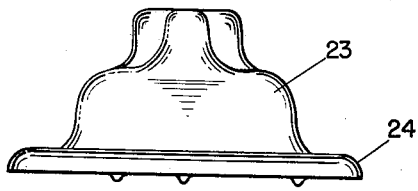
Figure 8 is a front elevation of the knob.

As shown in the drawings the cover is concavo-convex, provided, however, at the center of its outer face with a flat circular area 13. Near the perimeter of this area and diametrically opposed from the handle 8, is a relief vent 14 terminating at its upper end in a conical valve seat 15 and at its lower end in a shallow cup defined by an annular ridge 16 cast on the cover. A steel ball valve 17 is mounted within the seat and when seated closes the vent 14. As shown best in Figure 11 this ball projects slightly above the surface of the flat area 13. At the center of the flat area 13 is a threaded hole 18, and extending radially from this hole along the axis of the handle 8 is an elevated groove 19. Threaded within the hole 18 is a hollow cylindrical gudgeon or boss 21 terminating at its upper end in an enlarged head 22. A pressure-setting knob 23 is loosely and rotatably journalled on the boss 21, as shown best in Figure 11. This knob comprises a circular plate 24 on which is mounted a bulbous handle designed for easy manipulation. The plate of the knob is of substantially the same size as the flat area 13 and, therefore, overlies the ball 17 and the groove 19. The lower face of the knob plate is provided with five projections 25a, 25b, 25c, 25d and 25e which, as shown in Figure 10, are spaced apart by angles of 45° and each is progressively farther from the center of the knob. These projections are arranged in what may be described as a spiral.

Figure 11:
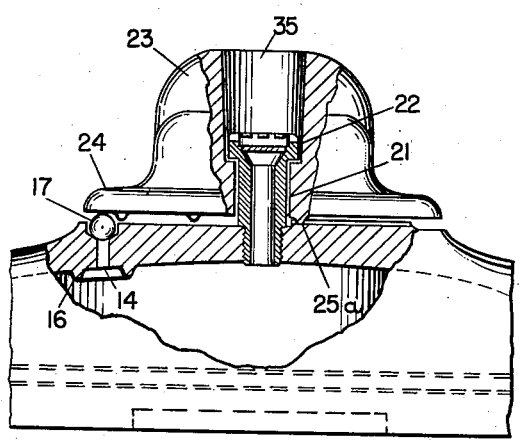
Figure 11 is an enlarged view, partly in vertical section, showing the relationship between the relief pressure ball valve, the pressure-setting knob and the safety valve.
Figure 12:
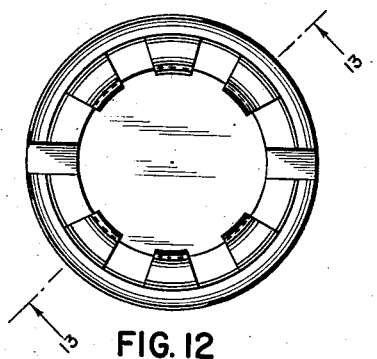
Figure 12 is a plan view, on a still further enlarged scale, of the upper end of the safety valve.
Figure 13:
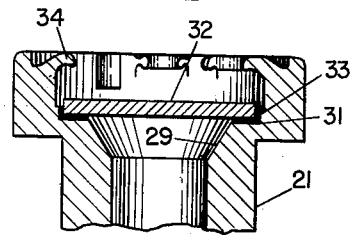
Figure 13 is a vertical section taken along line 13—13 of Figure 12 and showing the means for holding the disk of the safety valve from flying out of the cooker when the solder which holds it has softened.
Figure 6:
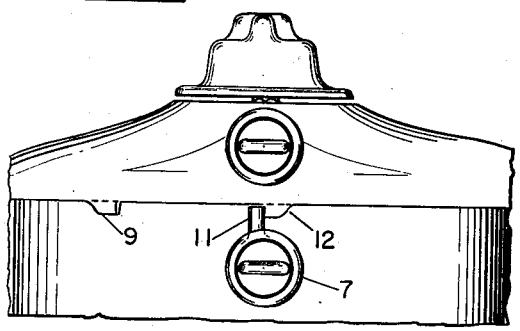
Figure 6 is a side elevation of the upper part of the cooker looking toward the ends of the handles and showing the cover seated on the container in closed position.

Figure 11 shows the knob supported upon the ball 17 and the projection 25a, which lies within the groove 19. As the knob 23 is symmetrical, its center of gravity lies along its vertical axis. Thus, taking moments about the point 25a, we have the weight of the knob acting through the short distances between its axis and the point 25a counterbalancing the upward thrust of the steam against the ball 17 acting through the much larger distance between the ball and the point 25a. The cooker is so designed that when in this position an internal steam pressure of five pounds per square inch, acting upon the ball, will overcome the effective weight of the knob, tilting it about the projection 25a, and permitting the ball to rise and the cooker to blow. Although the knob is mounted loosely enough to tilt under the outward thrust of the ball, it cannot tilt far enough to enable the ball to leave its seat altogether. If the cook desires a higher pressure he turns the knob through 45° until the projection 25b lies within the groove 19. In this position the moment arm of the knob is increased by the greater distance of the projection 25b from the center of the knob. In this position an internal steam pressure of 7½ pounds is required to raise the ball 17 against the effective weight of the knob. In the cooker illustrated, five different cooking pressures are provided: 5, 7½, 10, 12½ and 15 pounds, the proper position of the knob for each being indicated when the numerals 1, 2, 3, 4 and 5, respectively, are aligned with an arrow 26 marked on the upper face of the cover.

Figure 9:
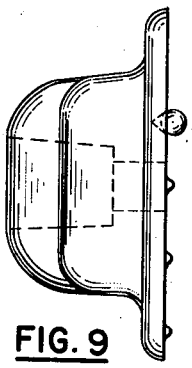
Figure 9 is a side elevation of the knob.

In order to enable the cooker to vent at substantially atmospheric pressure, I provide the underface of the plate 24 with a depression 27 large enough to receive the ball 17, as shown best in Figure 9. Diametrically opposed from the depression 27, and spaced from the center of the knob a distance equal to that of projection 25e, I provide a sixth projection 28. When the knob is turned so that this projection lies within the groove 19, the depression 27 overlies the ball 17 and the knob is supported by the projection 28 and some of the other projections 25 engaging the area 13. Thus the only counter-pressure exerted is that of the weight of the ball itself and this is insignificant. In order to set the knob at this position, the cook turns it until the word "Vent" lies adjacent the arrow 26.

I have combined the safety valve with the setting knob in a manner which I shall now describe. The upper end of the hollow boss 21 flares outward at 29 where there is provided an annular seat 31 in which is seated a circular metallic disk 32 preferably copper-plated steel. This disk is held in its seat against ordinary working pressures by means of a solder 33, the constituent elements of which are so chosen and proportioned that the solder will soften at about 280° F. When the pressure within the cooker reaches from 27 to 32 pounds, the temperature will have reached 280° F., the solder will thereupon cease to be effective and the disk 32 will blow off under the steam pressure reaching it through the hollow bore of the boss. As the failure of the solder might be sudden, and the disk fly into the room at considerable speed and perhaps cause damage, I have swaged the upper inner edge of the boss to provide six overhanging projections 34 which, all together, effectively prevent the disk 32 from being catapulted out of the cooker. The height of the knob 23 is considerably greater than that of the boss 21 so that the disk 32 lies within a cap-like depression 35 in the top of the knob. The disk is thus effectively protected against damage and cannot be accidentally dislodged.

The body, cover, and knob of the cooker are preferably made of aluminum, the bushing 21 of copper-coated screw steel, and the handles 7 and 8 of wood or other suitable non-heat-conducting material.

I claim:

1. Pressure control means for a pressure cooker, having a pressure relief vent, comprising a valve in the vent, a weight loosely and rotatably mounted on the cooker and overlying the valve, and a plurality of projections on the underface of the weight spaced at different radial distances from the axis of the weight, the weight being supported upon the cooker by the valve and one of the projections beyond the center of gravity of the weight, so that by turning the weight it is possible to select which of the projections will serve as the second support or fulcrum for the weight and thereby control the cooking pressure.

2. Pressure control means for a pressure cooker having in its cover a pressure relief vent and a groove spaced therefrom, comprising a valve in the vent, a weight loosely and rotatably mounted on the cover between the valve and the groove and overlying both, and a plurality of projections on the underface of the weight spaced different radial distances from the axis of the weight, and each designed to lie, one at a time, within the groove, the weight being supported upon the cooker by the valve and that projection lying within the groove.

3. Pressure control means for a pressure cooker having in its cover a pressure relief vent and a groove spaced therefrom, comprising a ball valve in the vent, a weighted knob loosely and rotatably mounted on the cover between the valve and the groove, overlying both and partly supported by the ball, and a plurality of projections on the underface of the knob spaced different distances from the center of gravity of the knob and each designed to lie, one at a time, within the groove and share the support of the knob with the ball and serve as a fulcrum for the knob, so that, by turning the knob to place a selected projection within the groove, the external pressure on the ball can be varied and the cooking pressure thereby controlled.

4. Pressure control means for a pressure cooker having in its cover a pressure relief vent and a groove spaced therefrom, comprising a ball valve in the vent, a weighted knob loosely and rotatably mounted about its center of gravity on the cover between the valve and the groove, overlying both and partly supported by the ball, and a plurality of projections on the underface of the knob spaced different radial distances from the center of gravity of the knob and each designed to lie, one at a time, within the groove and share the support of the knob with the ball and serve as a fulcrum for the knob, so that, by turning the knob to place a selected projection within the groove, the external pressure on the ball can be varied and the cooking pressure thereby controlled.

5. Pressure control means for a pressure cooker having in its cover a pressure relief vent and a groove spaced therefrom, comprising a ball valve in the vent, a weighted knob loosely and rotatably mounted on the cover between the vent and the groove with its periphery overlying both and partly supported by the ball, and a plurality of projections on the underface of the knob arranged spirally with respect to the knob axis and each designed to lie, one at a time, within the groove and share the support of the knob with the ball and serve as a fulcrum for the knob, so that, by turning the knob to place a selected projection within the groove, the external pressure on the ball can be varied and the cooking pressure thereby controlled.

6. Pressure control means for a pressure cooker having in its cover a pressure relief vent and a groove spaced therefrom, comprising a ball valve in the vent, a weighted knob loosely and rotatably mounted about its center of gravity on the cover between the vent and the groove and overlying and partly supported by the ball, a plurality of projections on the underface of the knob spaced different radial distances from the axis of the knob and each designed to be selectively placed within the groove to share the support of the knob with the ball and serve as a fulcrum for the knob, and a pointer on the cover and indicia on the knob corresponding to the several projections and so positioned that when any indicium is placed in alignment with the pointer its projection lies within the groove, whereby, by manipulating the knob, the external pressure on the ball can be determined and the cooking pressure thereby controlled.

7. Pressure control means for a pressure cooker having a pressure relief vent, comprising a valve in the vent, a weight loosely and rotatably mounted on the cooker and overlying the valve, a plurality of projections on the underface of the weight spaced at different radial distances from the axis of the weight, the weight being supported upon the cooker by the valve and one of the projections beyond the center of gravity of the weight, and a depression in the underface of the weight of such size and position that it may overlie the valve and permit venting of the pressure within the cooker, whereby, by turning the weight, it is possible to select which of the projections will serve as the second support or fulcrum for the weight, or to place the depression over the valve, and thereby control the cooking pressure.

8. Pressure control means for a pressure cooker having in its cover a pressure relief vent and a groove spaced therefrom, comprising a ball valve in the vent, a weighted knob loosely and rotatably mounted about its center of gravity on the cover between the vent and the groove and overlying and partly supported by the ball, a plurality of projections on the underface of the knob spaced different distances from the center of gravity of the knob and each designed to lie, one at a time, within the groove and share the support of the knob with the ball and serve as a fulcrum for the knob, and a depression in the underface of the knob spaced the same distance from its axis as the ball and deep enough to receive the ball, whereby, by turning the knob to place a selected projection within the groove or the depression over the ball, the external pressure on the ball can be varied and the cooking pressure thereby controlled.

9. Pressure control means for a pressure cooker having a lid with a pressure relief vent therein, comprising a valve in the vent, a weight resting by gravity both upon the valve and upon the lid at a point spaced from the valve, said weight being movable independently of both the valve and the lid, and means for varying the distance at which the weight rests upon the lid from the valve to vary the effective pressure exerted by the weight against the valve and thereby control the cooking pressure.

10. Pressure control means for a pressure cooker having a lid with a pressure relief vent therein, comprising a valve in the vent, a weight mounted for horizontal rotary movement on the cooker, said weight resting by gravity both upon the valve and upon the cooker at a point spaced from the valve, means effective upon rotation of the weight for varying the distance at which the weight rests upon the cooker from the valve to vary the effective pressure exerted by the weight against the valve and thereby control the cooking pressure.

11. Pressure control means as set forth in claim 10 in which the axis of rotation of the weight is intermediate the valve and the point at which the weight rests on the cooker.

CHARLES W. ABERCROMBIE.

REFERENCES CITED

The following references are of record in the file of this patent:

UNITED STATES PATENTS

| Number | Name | Date |
|---|---|---|
| 243,847 | Burritt | July 5, 1881 |
| 929,973 | McNutt | Aug. 3, 1909 |
| 1,383,389 | Davis | July 5, 1921 |
| 1,676,650 | Holmes | July 10, 1928 |
| 1,812,888 | Maynard | July 7, 1931 |
| 1,823,595 | Ducroux | Sept. 15, 1931 |
| 1,915,899 | Monro | June 27, 1933 |
| 2,188,735 | Grundstrom | Jan. 30, 1940 |
| 2,200,903 | Stephens | May 14, 1940 |
| 2,456,134 | Laeneburg | Dec. 14, 1948 |
| 2,467,716 | Abercrombie | Apr. 19, 1949 |

FOREIGN PATENTS

| Number | Country | Date |
|---|---|---|
| 169,047 | Great Britain | of 1921 |